Aug. 28, 1951
M. H. GRAHAM ET AL
2,565,964
PRESSURE COOKER LOCKING DEVICE
Filed March 8, 1948
4 Sheets-Sheet 1
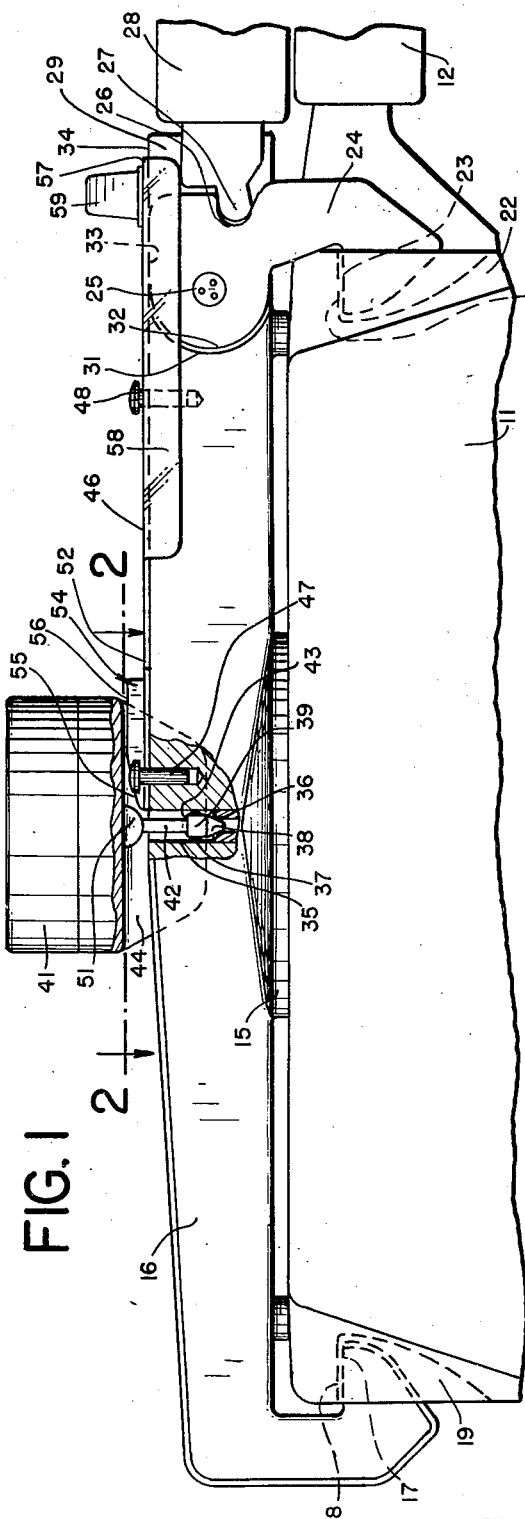
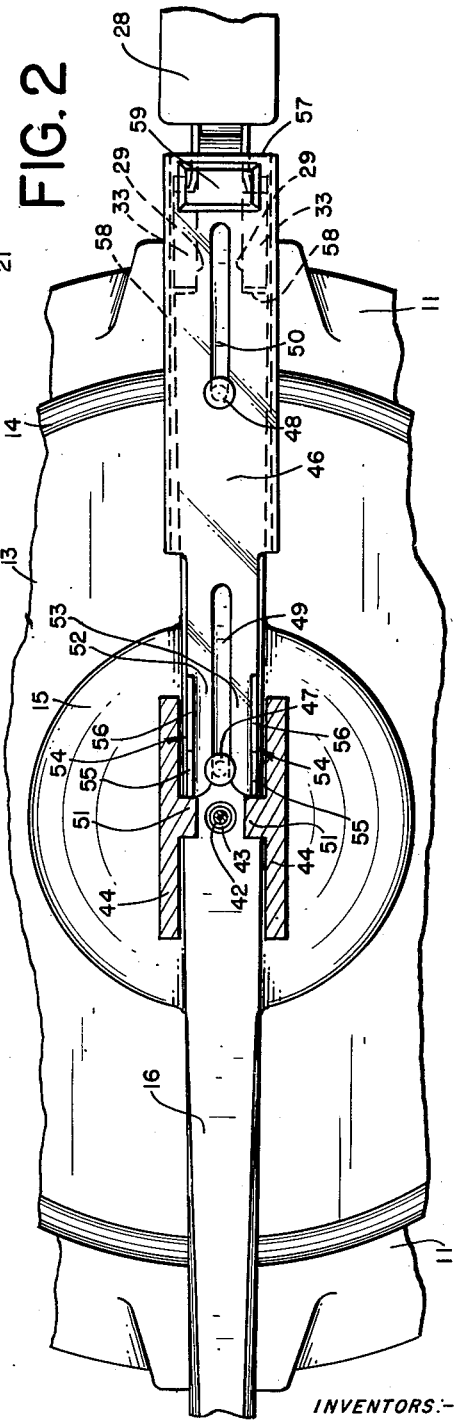
INVENTORS:-
MAURICE H. GRAHAM
CLEMENT WOOD CLEMONS
BY William C. Babcock ATTY.

Aug. 28, 1951
M. H. GRAHAM ET AL
2,565,964
PRESSURE COOKER LOCKING DEVICE
Filed March 8, 1948
4 Sheets-Sheet 2
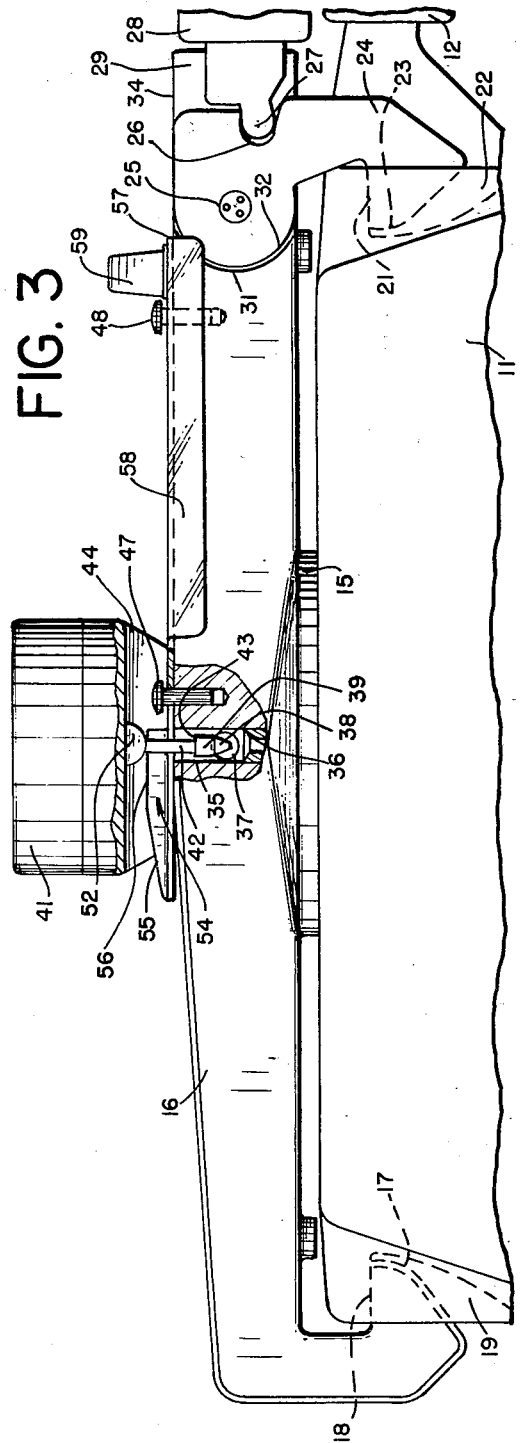
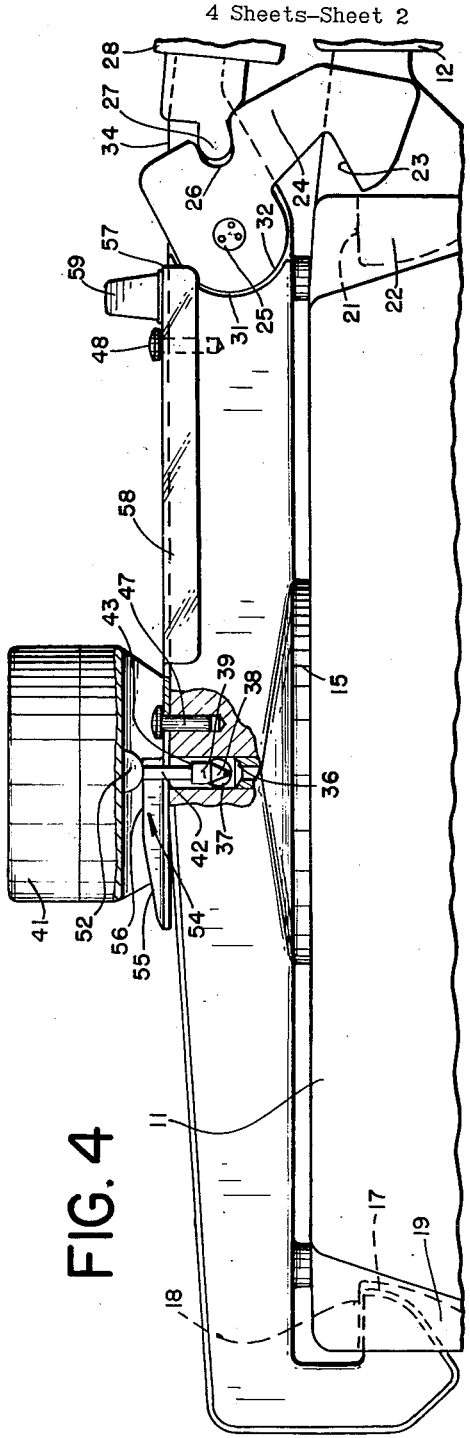
INVENTORS:-
MAURICE H. GRAHAM
CLEMENT WOOD CLEMONS
BY William C. Babcock ATTY.

Aug. 28, 1951   M. H. GRAHAM ET AL   2,565,964
PRESSURE COOKER LOCKING DEVICE
Filed March 8, 1948   4 Sheets-Sheet 3

INVENTORS:—
MAURICE H. GRAHAM
CLEMENT WOOD CLEMONS
BY William C. Babcock ATTY.

Aug. 28, 1951 M. H. GRAHAM ET AL 2,565,964
PRESSURE COOKER LOCKING DEVICE
Filed March 8, 1948 4 Sheets-Sheet 4

INVENTORS:-
MAURICE H. GRAHAM
CLEMENT WOOD CLEMONS

BY William C. Babcock ATTY.

Patented Aug. 28, 1951

2,565,964

UNITED STATES PATENT OFFICE 2,565,964

PRESSURE COOKER LOCKING DEVICE

Maurice H. Graham and Clement Wood Clemons, Minneapolis, Minn., assignors to General Mills, Inc., a corporation of Delaware Application March 8, 1948, Serial No. 13,698

10 Claims. (Cl. 220—44)

This application relates to pressure cookers and more particularly to an improved locking device which prevents removal of the cover from the cooker until after the pressure has been released.

Various safety devices have been proposed in the past to prevent an operator from inadvertently removing the cover from such a cooker while there is still substantial steam pressure inside the cooker body. Many of these devices have been too complicated in construction to enjoy widespread use or any particular degree of commercial success.

It is accordingly one object of the present invention to provide an improved locking device for a pressure cooker.

It is another object to provide a cooker with relatively movable retaining means on the cover and body for retaining the cover in position, and with a pressure control member movable to an open position for release of pressure, in combination with operative means preventing movement of the cover-retaining means until the control member is moved to its open position.

Other objects and advantages will be apparent from the following specification in which one embodiment of the invention has been described with particular reference to the accompanying drawings.

In these drawings, wherein like reference characters indicate like parts, Figure 1 is a partial side elevation of a cooker embodying the present invention, certain portions being broken away and shown in section for clearness. The cooker is shown in locked position.

Fig. 2 is a partial top plan of the cooker of Fig. 1 with certain parts shown in section on the line 2—2 of Fig. 1.

Fig. 3 is a view similar to Fig. 1 with the locking means of the present invention moved to unlocked position.

Fig. 4 is a view similar to Fig. 3 with the cover-retaining means moved to a position which permits removal of the cover.

Figure 5:
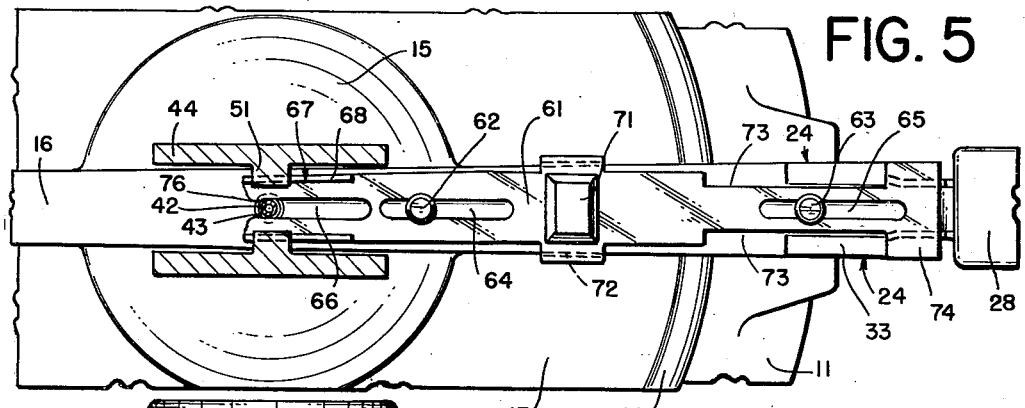
Fig. 5 is a partial top plan of a cooker in which an alternate embodiment of the invention is shown, certain portions of the pressure control member being broken away for clearness, and the device being in unlocked position.

With reference to the embodiment of Figs. 1-4, the invention has been shown in connection with a cooker body or pot 11 of any desired shape and construction. Body 11 is provided with a handle 12. A cover 13 (shown in Fig. 2) provided with a sealing gasket 14 is adapted to close the opening in the top of cooker body 11.

This cover 13 is fastened to the enlarged portion 15 of the supporting bridge or cross bar 16 which extends diametrically across the top of the cooker body.

While any desired mounting and retaining means for cover 13 may be employed, this cross bar or bridge construction has been shown as one suitable arrangement in which the present invention may be utilized. To retain bridge 16 on the cooker body, the bridge is provided at one end with a hook 17 adapted to engage a locking recess 18 in the thickened portion 19 of the cooker body.

At the other side of the body another locking notch 21 is provided in the thickened portion 22 of the body. In the form shown in the drawing there are two such locking notches 21 positioned one on each side of the extension which supports handle 12.

A locking hook 23 of latch member 24 is adapted to engage notch 21. Latch 24 is relatively movable with respect to notch 21 between a closed or locked position as shown in Fig. 1 and an open or unlocked position as shown in Fig. 4. It will be apparent that in the closed position of latch 24 the bridge and cover will be held in place and cannot be removed from the cooker body, while in the open position of the latch, as shown in Fig. 4, the cover and bridge may be removed from the body or mounted on the body.

To permit this relative movement between latch 24 and locking notch 21, the latch has been mounted on a pin 25 extending through bridge 16 so that the latch is rotatable around the axis of said pin between the positions just described. While any desired method may be employed for rotating the latch between these two positions, a structure has been shown in which latch member 24 has an actuating notch 26. This notch is engaged by a projection 27 associated with an operating handle 28. The outer end of handle 28 is pivoted to the outer end or extension of bridge 16. (The pivot point is omitted from the drawing to save space.) Thus movement of handle 28 with respect to handle 12 will cause projection 27 to move notch 26 and rotate the latch, a latch and handle construction of this type is described and claimed in the co-pending application of C. C. Schweiso, Serial No. 24,764, filed May 3, 1948, and assigned to the assignee of the present invention.

In the construction shown there are two of these latches, one at each side of bridge 16. Similarly, there are two actuating projections 27 on each side of the bridge, both of said projections being associated with handle 28. The bridge 16 is cut away or narrowed at the portion 29 as shown in Figs. 1 and 2 in order that the outer faces of the respective latches 24 may be substantially flush with the outside lateral faces of the remaining portions of bridge 16. This portion 29 is cut away along an arc 31 having as its center the axis of pivot pin 25. Thus the arcuate cut-away portion cooperates with the circular portion 32 of latch 24 to form a substantially smooth junction between the outer surfaces of the latch and the bridge.

The top surface 33 of latch 24 is extended in a straight shoulder which is substantially parallel to and flush with the horizontal top surface 34 of bridge 16 when the latch 24 is in the locked position of Fig. 1. This extended flat portion or shoulder 33 of the latch will then obviously project above the top of cross bar 16, as shown in Fig. 4, when the latch is moved to its open or unlocked position.

For the control of pressure within the cooker body 11 the following mechanism has been provided:

At an intermediate point on bridge 16 a vertical passage 35 is provided which communicates with the interior of the cooker so that the pressure in the passage will correspond at all times to that within the cooker. At an inner portion of this passage 35 there is a valve seat 36 which may be formed either by reducing the diameter of the lower portion of the passage or by insertion of a separate bushing. Just above valve seat 36 lateral openings 37 are provided through each side of the bridge to connect the passage 35 with the atmosphere, whenever valve seat 36 is open.

To close this valve opening at 36 a conical valve member 38 is provided at the bottom of the stem 39. This stem extnds downwardly in line with the center of gravity of the pressure control weight 41. It will be understood that the weight of control member 41 is so chosen with reference to the diameter of valve seat 36 that when the pressure in the pot increases to a certain predetermined value, the valve 38 and weight 41 will be lifted against the action of gravity to permit relief of pressure through lateral openings 37.

Stem 39 is provided with an upper portion 42 which is of reduced diameter, in order to provide an annular locking shoulder 43, the purpose of which will be described below. Depending lateral flanges 44 extend downwardly from weight member 41 at each side of bridge 16 and serve both to lower the center of gravity of the weight with respect to valve seat 36 and also to assist in the controlled deflection of steam issuing from ports 37.

In order to raise the control weight 41 whenever the operator desires to release the internal pressure manually, a movable control member 46 has been provided. While the structure and mounting of such control member may be varied within rather wide limits without departure from the spirit of the present invention, a control member has been shown which is in the form of a slide mounted for longitudinal movement along bridge 16. Headed studs or driven pins 47 and 48 on bridge 16 cooperate with slots 49 and 50 of slide 46 to retain the slide on the bridge and permit movement of the slide between two extreme positions as limited by the dimensions of slot 50.

Cooperating means are provided on slide 46 and pressure control member 41 which operate to move the control member from the closed position of Fig. 1 to the open position of Fig. 3 as the slide 46 is moved from its right hand position as shown in Fig. 1 to the left-most position indicated in Fig. 3. These cooperating means take the form of lifting portions 51 on the control member, and cams 54 on the slide 46. The cams are provided by turning up the edges of the end portions 52 and 53 of slide 46. These end portions 52 and 53 constitute the edges of the slot 49, said slot being open at its outer or left-hand end as shown in the drawings. Cams 54 consist of a sloping portion 55 and a flat horizontal top portion 56.

The cooperating lifting portions 51 on the pressure control member 41 are symmetrically positioned, one at each side of stem 39 so that the effective center of lift of the two portions 51 considered as a unit will be aligned with the center of gravity of the weight.

In the position of slide 46 shown in Figs. 1 and 2, the cams 54 are out of engagement with projections 51 and therefore the valve portion 38 engages and closes the valve seat 36 under the influence of gravity on the weight member 41. Movement of slide 46 from the position of Fig. 1 to the position of Fig. 3 will result in engagement of cams 54 with lifting projections 51 so that weight member 41 and valve 38 will be lifted to permit relief of pressure through lateral openings 37.

It will be noted that the diameter of reduced portion 42 of stem 39 is so chosen that this reduced portion fits within open slot 49. Thus the annular locking shoulder 43, which is of greater diameter than reduced portion 42 or the width of slot 49, will be blocked by the extensions 52 and 53, which constitute the sides of slot 49, in at least one position of the slide 46, i. e., the position shown in Figs. 3 and 4. The purpose of such a locking shoulder 43 is to prevent accidental dropping and damage of weight member 41 in case the bridge member 16 is carelessly inverted. While this locking shoulder 43 and extensions 52 and 53 could be so dimensioned that the weight member would be locked in place at all times, it is considered preferable to have at least one position of slide 46 in which the weight member 41 may be freely removed from the bridge 16 to permit cleaning of the parts. Such a position is shown in Figs. 1 and 2. It will be understood that in this position of slide 46 the cooker is ordinarily in use and it is unlikely that the entire assembly including both the bridge 16 and the cooker body 11 would be accidentally inverted. Hence in this position, it is less important to prevent accidental removal of the weight 41. In the position shown in Figs. 3 and 4, however, it will be apparent that the bridge member and cover 13 could be removed from the cooker body 11 and might be accidentally inverted by the user. Therefore, it is desirable when the slide is in the position of those figures to have the extensions 52 and 53 block the annular locking shoulder 43 to prevent removal of the weight.

The other end of slide 46 is designed to cooperate with the relatively movable retaining means which holds the cover and body in their assembled relation in order to prevent movement of said retaining means when the valve 38 is in closed position with respect to valve seat 36. In the specific embodiment shown in the drawings, the end 57 of slide 46 is arranged so that it extends back over the flat horizontal shoulder 33 of latch 24 when the latch is in closed position and slide 46 is in the position of Figs. 1 and 2. In this position it will be apparent that any attempt to rotate latch 24 to the open position of Fig. 4 will be prevented by engagement of shoulder 33 against the under side of end portion 47 of slide 46. Thus, when the parts are in the cooking position of Figs. 1 and 2, it is impossible to rotate latch 24 to remove the cover from the cooker, without first moving slide 46 to the left (i. e., to the position of Fig. 3), in which the cams 54 have engaged lifting portions 51 to raise the weight 41 and valve 38 for relief of pressure through ports 37.

In order to strengthen the locking portion 57 of slide 46, two depending flanges 58 are provided, one at each side of bridge 16. It will be remembered that the outer lateral faces of the latches 24 and bridge 16 are substantially flush with each other and these flanges 58 of slide 46 are adapted to lie closely adjacent the outer lateral surfaces of the latch and bridge.

In order to facilitate movement of the control member 46 between the position of Figs. 1 and 2 and the position of Figs. 3 and 4, a suitable knob or handle 59 has been mounted at the locking end 57 of the slide. This knob or handle 59 may be of plastic or other heat resistant material and may be fastened to the slide in any desired manner.

Once the slide 46 has been moved to the position of Fig. 3 so that weight 41 is lifted and valve 38 is open, the noise of escaping steam will serve as an effective warning to prevent the user from trying to rotate latch 24 to its open position. When the steam has escaped so that the excess pressure has been relieved, it will then be a simple matter to open the latch as shown in Fig. 4 and thereafter remove the bridge 16 and cover 13.

Figure 6:
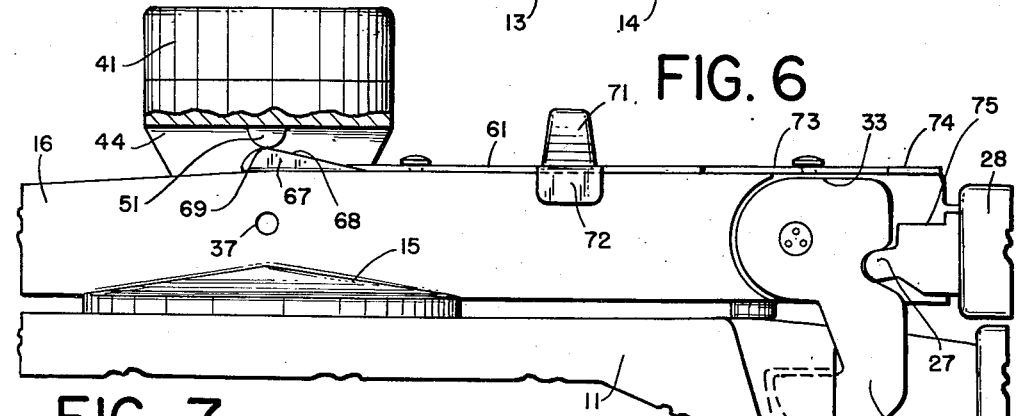
Fig. 6 is a partial side elevation of the device of Fig. 5, also in the unlocked position.
Figure 7:
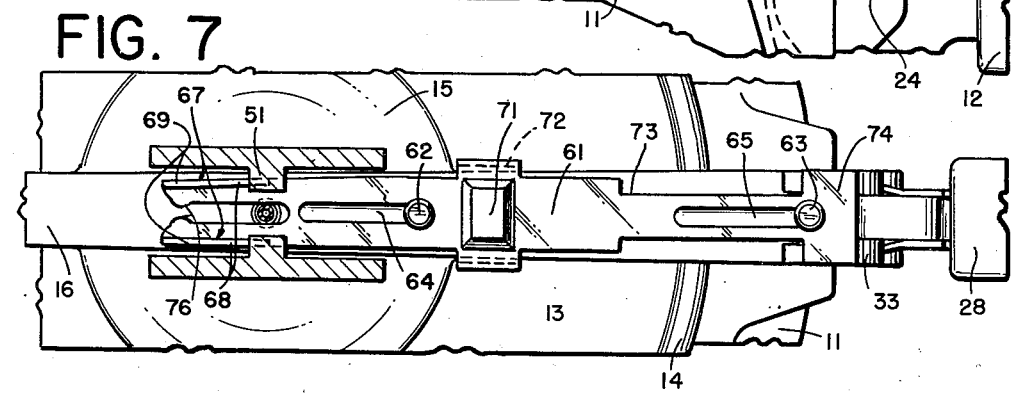
Fig. 7 is a partial top plan similar to Fig. 5, but with the device in locked or cooking position.

With reference to Figs. 5 through 7, an alternate embodiment of the invention has been shown. In this embodiment, the construction of the cooker body 11, cover 13, cross bar 16, and the handle and latch mechanism are identical to the similar portions of the device shown in the previous figures and will not be described in detail. As shown in Fig. 5 a modified form of a locking slide 61 is mounted on cross bar 16 by means of driven pins or screws 62 and 63 which cooperate with longitudinal slots 64 and 65 of the slide. A slot 66 at one end of the slide 61 accommodates the stem portion 42 of the pressure control member just as in the previous embodiment. At this end of the slide, on opposite sides of the slot, cam surfaces or lifting portions 67 are provided. These portions 67, as shown in Fig. 6, include a gently sloping cam surface 68 which terminates in a raised portion 69 of substantial elevation. Movement of the slide 61 to the right to the position of Figs. 5 and 6 causes engagement of the cam portions 68 and 69 with the lifting projections 51 on the pressure control member 41 to lift said member to the raised position in which the pressure is relieved through side openings 37.

A suitable handle 71 is provided so that the operator may control the position of the slide. Vertically depending side flanges 72 may also be provided to assist in positioning the slide and guiding it for longitudinal movement on the bridge 16.

At the other end of the slide 61 adjacent handle 28, a cutaway portion or notch 73 is provided on each side, in order that the width of the slide at this point may be less than the distance between the inner faces of the locking hooks 24.

It will be remembered that the upper shoulders 33 of these hooks 24 project upwardly above the top of the bridge 16 as shown in Fig. 4 when the handle 28 is moved to actuate the latch. Thus in the position of the parts shown in Figs. 5 and 6, the cutaway portions 73 are aligned above the shoulders 33 so that those shoulders are free to project upwardly if the user lifts the inner end of handle 28. Thus, Figs. 5 and 6 show the slide parts in unlocked or open position. Since the lifting portions 67 in this position have raised the pressure control member 41 to permit relief of internal pressure, it will be apparent that as long as the slide is in this unlocked position, so that the latch 24 is free to rotate, the pressure control member 41 will remain raised and it will be impossible to build up pressure inside the cooker.

The cutaway portions 73 do not extend completely to the handle end of slide 61. Thus, a locking portion 74 of substantially the same width as the total width of the cross bar and latches 24 is provided at this end of the slide. When the slide is moved to the left to the position of Fig. 7, this locking portion 74 moves to a point just above the shoulders 33, where it effectively prevents upward movement of these shoulders and thus maintains the latches 24 in locked position. As long as the slide is in the position of Fig. 7, the locking portion 74 prevents the operator from moving latches 24 to open position. This position corresponds essentially to that of Figs. 1 and 2 in that the pressure control member 41 is now in its lowered position and pressure is permitted to build up within the cooker. As long as such pressure is maintained and the pressure weight remains in its lowered position, the latches 24 will remain locked.

Upon movement of slide 61 back to the position of Figs. 5 and 6, the pressure control member 41 will be lifted so that the pressure will be relieved and it will accordingly be safe to operate handle 28 and rotate latches 24 to open the cooker. A notch 75 in handle 28 permits operation of the handle without interference from portion 74 in this position.

The two positions of the slide 61 may be limited by the dimensions of the slots 64 and 65 and by engagement of the narrowed portions 76 of slot 66 against the stem 42. Thus movement of the slide 61 to the left, i. e., to the position of Fig. 7, is limited by the engagement of the ends of slots 64 and 65 against pins 62 and 63. Movement of the slide to the right-hand position of Fig. 5 is temporarily stopped by engagement of portions 76 against stem 42 of the pressure control member. It is possible to move the slide 61 still farther to the right so that the locking portion 74 projects over the handle 28 and so that the portions of the slide at each side of slot 66 are sprung apart slightly to permit narrowed portions 76 to pass the stem 42 and move to the right beyond the stem to a position where the stem and control member may be removed without engagement of stem shoulder 43 against the edges of slot 66.

Thus, in the embodiment shown in Figs. 5 through 7, a locking device has been provided in which, when the slide is pulled toward the latch end of the cross bar, i. e., toward the operator, the pressure control member will be raised to pressure relief position and the latch mechanism will be unlocked. Movement of the slide in the opposite direction, away from the operator, locks the latch mechanism and drops the pressure control member to sealing position so that the cooking operation may proceed without danger of removal of the cover.

Figure 8:
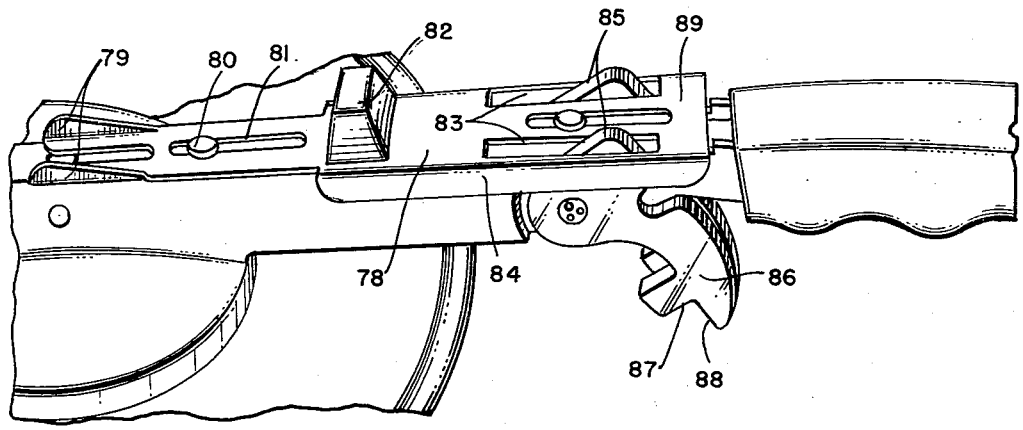
Fig. 8 is a partial perspective view of still another embodiment of the invention.
Figure 9:
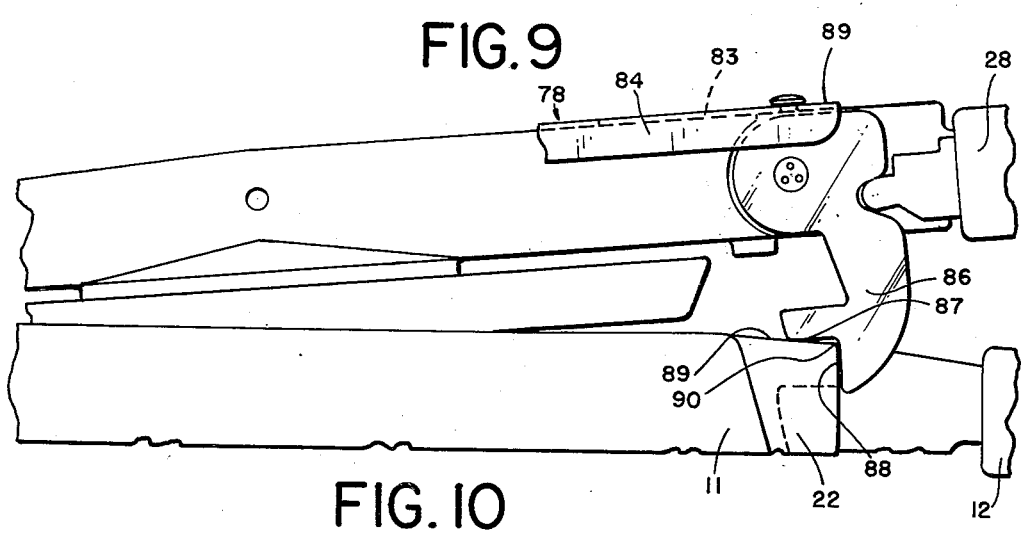
Fig. 9 is a partial side elevation of the cover and locking mechanism of Fig. 8 when said cover is inadvertently placed on the pot with the slide in locked position.

In the device of Figs. 8 and 9 a slide 78 has been provided which is similar in most respects to slide 61 of Figs. 5 through 7. Thus this slide has lifting portions 79 which engage and lift the pressure control member 41 in the same manner as described above. The slide is also mounted on the bridge by pin and slot connections 80 and 81 as in the previous case. A handle 82 enables the operator to move the slide readily.

At the locking end of slide 78 the cutaway portions 83 are in the form of two slots adapted to permit upward movement of shoulders 85 on latches 86 just as in the previous case. Slide 78 has side flanges 84 which extend downwardly outside the edges of the crossbar and latch and serve to strengthen the slide and prevent bending of the slide in case the operator tries to force the latches 86 to open position when the slide 78 is in locking position.

In Figs. 8 and 9 a modification of the latch itself is also shown, in which the bottom of the latch member 86 is provided with a flat portion 87. This portion 87 may be formed by notching the bottom of the latch as shown in Figs. 8 and 9 so that the edges of the notch are constituted of the flat portion 87 and a substantially vertical portion 88.

The purpose of this flat portion 87 is illustrated in Fig. 9 in which the cooker is shown with the parts in the position which they would occupy if the user inadvertently attempted to place the cover on the pot while the latch 86 and locking slide 78 were in their locked position. In such case, after engagement of the opposite end of the cross bar with its notch as shown at the lefthand portion of Fig. 1, the handle 28 would be lowered toward body handle 12. This lowering movement would be stopped (as shown in Fig. 9) when flat portion 87 of the latch encountered the flat top 89 of enlarged portion 22 of the pot. The presence of these cooperating flat surfaces 87 and 39 avoids any tendency for latch 86 to be rotated toward unlocked position against the locking portion 89 of slide 78. In the absence of such a notch or flat portion 87, there might in some cases be a tendency for the sloping bottom edge of the hook to engage the corner 89 of enlarged portion 22 and thus exert a camming action which would tend to spring the latch to open position against the action of slide 78 as the user attempted to squeeze handle 28 downwardly against handle 12. The presence of the notch or flat portion prevents any such camming action and thus serves as an additional safety factor in this construction.

Figure 10:
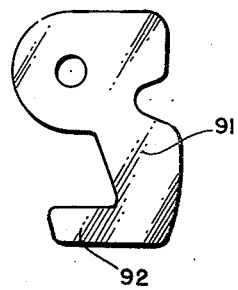
Fig. 10 is a side elevation of a modified form of latch.

It will be understood that the flattened portion 87 could extend all the way across latch 86, if desired, so that the latch would have a flat end rather than a notched end. Such a construction is shown in Fig. 10, where latch 91 has a flat bottom portion 92. This flat portion 92 serves the same purpose as the flat surface 87 in the notched latch 86 of Figs. 8 and 9. It will be clear that such a notch or flat portion may be used equally well in the embodiments of Figs. 1–4 and 5–7 respectively.

It will be apparent from the foregoing description that a construction has been shown in which a member operatively associated with the pressure control member of the cooker serves to block relative movement of the cover-retaining means on the cooker cover and body and thereby prevents removal of the cover until after the pressure control member has been moved to its open position. Obviously many variations in the specific details of construction of the parts and the manner in which they engage each other to perform the specific functions may be made by persons skilled in this field. It is therefore intended that the present invention shall include all such modifications, changes, and improvements as fall within the spirit and scope of the attached claims.

Now, therefore, we claim:

1. In a pressure cooker having a body, a removable cover, a movable latch for retaining said cover on said body, and a pressure control weight movable between a lower sealed position and a raised pressure relief position, the improvement comprising an operating member slidably mounted on said cooker for movement between first and second positions, a portion of said member engaging and lifting said weight to pressure relief position when said member is moved to its first position, and another portion of said member engaging and locking said latch in cover-retaining position when said member is moved to its second position.

2. A pressure cooker having a body provided with an opening, a cover for said opening, a removable cross bar to which said cover is fastened, a pivoted latch at one end of said cross bar movable between open and closed positions, said latch having a shoulder which is substantially flush with the top of said cross bar when the latch is in closed position and which projects above said cross bar top when said latch is opened, a pressure control member at an intermediate point on said cross bar movable between a sealed cooking position and an open pressure relief position, and an operating slide mounted on top of said cross bar for movement lengthwise of said bar between first and second positions, one end of said slide overlapping said shoulder and preventing movement of said latch from closed to open position when said slide is in its second position, and means on said slide engaging and moving said control member to open position when said slide is moved to its first position.

3. A pressure cooker according to claim 2, in which the outside lateral face of said latch is substantially flush with the lateral face of said cross bar, and in which a part of said slide is of inverted U-shaped channel cross section, with a side portion of said channel extending downwardly adjacent the lateral faces of the cross bar and latch.

4. A pressure cooker having a body provided with an opening, a cover for said opening, a removable cross bar to which said cover is fastened, cover-latching means at one end of said cross bar movable between open and closed positions, a pressure control member at an intermediate point on said cross bar movable between a sealed cooking position and an open pressure relief position, and an operating slide mounted on said cross bar for movement between a first position toward the latch end of the cross bar and a second position toward the pressure control member, one end of said slide engaging and locking said latching means in closed position when the slide is in said first position, and means on said slide engaging and moving said control member to open position when said slide is moved to its second position.

5. A pressure cooker having a body provided with an opening, a cover for said opening, a removable cross bar to which said cover is fastened, a pivoted latch at one end of said cross bar movable between open and closed positions, said latch having a shoulder which projects above the top of said cross bar when said latch is opened, and an operating slide mounted on top of said cross bar for movement lengthwise of said bar between first and second positions, one end of said slide overlapping said shoulder and preventing movement of said latch from closed to open position when said slide is in its second position, said slide having a cutaway portion positioned above said shoulder when the slide is in its first position, said cutaway portion permitting movement of the shoulder and latch to open position when said slide is in its second position.

6. A pressure cooker according to claim 5 having a pressure control member at an intermediate point on said cross bar movable between a sealed cooking position and an open pressure relief position, and means on said slide engaging and moving said control member to its open position when said slide is moved to its first position.

7. A pressure cooker according to claim 2 in which said cooker body has a substantially flat shoulder adjacent said opening and said pivoted latch has a substantially flat portion at its lower end for engagement against said horizontal body portion when said cover and cross bar are placed on the cooker body with said slide in its second position.

8. In a pressure cooker having a body, a removable cover, relatively movable retaining means on said cover and body for holding said cover on said body, and a pressure control member movable between a sealed cooking position and an open pressure relief position, the improvement comprising an operating member slidably mounted on said cooker for movement between first and second positions, means on said operating member blocking relative movement of said retaining means when said operating member is in said second position, and interengaging cam surfaces on said operating member and pressure control member for moving the latter to open position when the operating member is moved to its first position.

9. In a pressure cooker having a body, a removable cover, relatively movable retaining means on said cover and body for holding said cover on said body, and a pressure control weight movable between a sealed cooking position and a raised pressure relief position, the improvement comprising an operating member for the pressure control weight mounted on the cooker for movement between first and second positions, a portion of said operating member engaging and moving the pressure control weight to open position when the operating member is moved to its first position and permitting movement of the pressure control weight to cooking position when the operating member is moved to its second position, and another portion of said operating member cooperating with said relatively movable retaining means to block relative movement of said retaining means when the operating member is in said second position.

10. In a pressure cooker having a body, a removable cover, relatively movable retaining means on said cover and body for holding said cover on said body, and a pressure control weight movable between a sealed cooking position and a raised pressure relief position, the improvement comprising an operating member for the pressure control weight mounted on the cooker for movement between first and second positions, interengaging means on the operating member and pressure control weight moving the latter to open position when the operating member is moved to its first position and permitting movement of the pressure control weight to cooking position when the operating member is moved to its second position, and means on said operating member cooperating with said relatively movable retaining means to block relative movement of said retaining means when the operating member is in said second position.

MAURICE H. GRAHAM.
CLEMENT WOOD CLEMONS.

REFERENCES CITED

The following references are of record in the file of this patent:

UNITED STATES PATENTS

| Number | Name | Date |
| --- | --- | --- |
| 2,308,320 | Stephens | Jan. 12, 1943 |
| 2,436,566 | Goldberg | Feb. 24, 1948 |

FOREIGN PATENTS

| Number | Country | Date |
| --- | --- | --- |
| 302,787 | Great Britain | Dec. 27, 1928 |